United States Patent Office 3,842,015
Patented Oct. 15, 1974

3,842,015
ALUMINATE SUPPORTED CATALYTIC COMPOSITION AS AN EXHAUST GAS CATALYST
Wilhelm Vogt, Hurth-Efferen, Hermann Glaser, Lechenich, and Helmut Dyrschka, Kottingen, Germany, assignors to Knapsack Aktiengesellschaft, Knapsack, near Cologne, Germany
No Drawing. Filed Nov. 17, 1972, Ser. No. 307,586
Claims priority, application Germany, Nov. 20, 1971,
P 21 57 625.0; Dec. 29, 1971, P 21 65 241.5
Int. Cl. B01j 11/40
U.S. Cl. 252—455 R                              9 Claims

ABSTRACT OF THE DISCLOSURE

Carrier-supported catalyst in which the active ingredients are comprised of copper, manganese, nickel and optionally cobalt oxides on an alkaline earth metal aluminate carrier. The preferred alkaline earth metal aluminate carriers comprise barium, strontium and calcium aluminates.

---

The present invention relates to a carrier-supported catalyst comprising oxides of copper, manganese and nickel as its active ingredients and optionally cobalt oxides as an additional active ingredient, and to a process for making the catalyst.

It has already been reported that carbon monoxide and hydrocarbons can be burnt using catalysts, wherein the active ingredients are selected from noble metals belonging to Group VIII of the Periodic System of the elements, or are mixed oxides, for example of copper, manganese and nickel, the mixed oxides being preferred for reasons of economy so as to enable wide use to be made of such catalysts, for example in the purification of motor exhaust gas.

If use for the purification of motor exhaust gas, the catalysts are found during the period that lapses between the cold start and the warm running of an internal combustion engine to be subject to strongly different temperatures, which may be as high as 100° C. under full load to which further adds the combustion heat of carbon monoxide and hydrocarbons. Conventional mixed oxide catalysts, which need temperatures between 150 and 200° C. to commence activity, have been found to lose much of their reactivity by intermediary exposure to higher temperatures.

As a safeguard against high temperatures, it has been attempted to arrange mixed oxide catalysts near the end of the exhaust gas outlet of internal combustion engines, where the exhaust gas has a lower temperature, owing to the abstraction of heat. This, however, is not fully satisfactory as it is necessary for a motor to run a certain period of time to bring the mixed oxide catalyst to working temperature. As a result, following the start of the motor, the motor exhaust gas initially remains unburnt.

Attempts have also been made to arrange the mixed oxide catalysts directly downstream the combustion engine and to provide thermally actuated switch valves as a safeguard against high temperatures. The valves which must be tinderproof are costly and not perfectly reliable.

It is accordingly an object of the present invention to provide a mixed oxide catalyst fully active at temperatures up to substantially 1000° C. for the combustion of carbon monoxide and hydrocarbons with oxygen-containing gases to carbon dioxide and water. This is achieved in accordance with the present invention by the use of a catalyst containing barium aluminate as the catalyst carrier.

Further embodiments of the carrier-supported catalyst of the present invention, which can be used singly or in combination, comprise:

(a) using barium aluminate having between 2 and 30 weight percent of silicon dioxide therein;
(b) using barium aluminate having between 10 and 20 weight percent of silicon dioxide therein;
(c) using barium aluminate having between 2 and 30 weight percent of titanium dioxide therein;
(d) using barium aluminate having between 5 and 20 weight percent of titanium dioxide therein;
(e) using barium aluminate having silicon dioxide and titanium dioxide therein;
(f) using barium aluminate having a total proportion between 2 and 30 weight percent of silicon dioxide and titanium dioxide therein;
(g) replacing the barium aluminate at least partially by one or more alkaline earth metal aluminates other than barium aluminate;
(h) replacing between 0 and 90 weight percent of the barium aluminate by one or more alkaline earth metal aluminates other than barium aluminate;
(i) replacing up to 75 weight percent of the barium aluminate by one or more alkaline earth metal aluminates other than barium aluminate;
(j) using calcium aluminate as the alkaline earth metal aluminate;
(k) using strontium aluminate as the alkaline earth metal aluminate;
(l) using aluminates having between 2 and 30 weight percent of one or more silicon-containing compounds therein;
(m) using aluminates having between 10 and 20 weight percent of one or more silicon-containing compounds therein;
(n) using aluminates having silicon dioxide therein;
(o) using aluminates having silicic acid-containing minerals therein;
(p) using aluminates having magnesium silicates, preferably talc, therein;
(q) using aluminates having between 2 and 30 weight percent of titanium dioxide therein;
(r) using aluminates having between 5 and 20 weight percent of titanium dioxide therein.

A further object of the present invention is to provide a process for making the carrier-supported catalyst, which comprises impregnating barium aluminate with an aqueous solution of copper, manganese, nickel and optionally cobalt salts of volatile acids, the solution being used in the quantity necessary just to permit complete absorption thereof by the barium aluminate; decomposing the metal salts applied to the barium aluminate, at temperatures between 300 and 600° C.; and annealing the resulting catalyst at temperatures between 600 and 1200° C.

Further embodiments of the process of the present invention for making a carrier-supported catalyst, which can be used singly or in combination, provide:

(s) for the use of nitrates as the copper, manganese, nickel and optionally cobalt salts of volatile acids;
(t) for the metal nitrates to be decomposed at temperatures between 350 and 450° C.;
(u) for the catalyst to be annealed at temperatures between 600 and 1000° C.

The carrier-supported catalyst of the present invention has been found suitable for use in the oxidation of carbon monoxide and hydrocarbons up to temperatures substantially of 1000° C. A catalyst specimen annealed at 1000° C., for example, was unexpectedly found to have an improved activity compared with that of an otherwise identical catalyst specimen, save that it was annealed at 600° C.

In the carrier-supported catalyst of the present invention, the carrier comprising barium aluminate and one or more addends selected from silicon dioxide, titanium oxide and mixtures thereof, and the active ingredient comprising oxides of copper, manganese, nickel and optionally cobalt, are used, for example in a ratio between 5 and 20 parts by weight of carrier and 1 part by weight of active ingredient. The active ingredient contains the metal oxides in the atomic proportions of

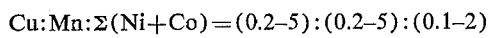

for example 1.5:1.0:0.5.

The barium aluminate carrier can be produced in various ways.

For example, barium oxide or carbonate may be ground jointly with aluminum oxide in a molar ratio of barium compound:$Al_2O_3$=1:1, in a vibratory disk mill. The resulting oxide mixture is annealed at temperatures between 600 and 1500° C. for a period between 5 and 20 hours and thereby converted to aluminate. Prior to effecting the annealing step, the mixture of barium oxide or carbonate and aluminum oxide may be pelletized, if desired.

It is also possible to stir the mixture of barium oxide or carbonate and aluminum oxide together with an aqueous solution of a thickening agent, e.g. tylose, and make the whole into a paste which can be extruded and made into strands. These are dried and annealed and barium aluminate with a volume of pores very favorable for use at high reaction velocities is obtained.

The carrier can also be produced by subjecting an aqueous solution of barium nitrate and aluminum nitrate, which are used in stoichiometric proportions, to evaporation to dryness and heating the residue to the temperature necessary to effect the decomposition of the nitrates and the formation of the aluminates. In this event, it is possible to use an aqueous solution which already has the active nitrate components therein.

A still further process for making barium aluminate comprises introducing, with agitation, pulverulent reactive aluminum oxide or hydroxide into a barium hydroxide solution maintained between 60 and 100° C., the barium aluminate being obtained after some hours.

Mixed calcium-barium aluminates or strontium-barium aluminates or calcium-strontium-barium aluminates have been found to be particularly hard carriers. Following impregnation with copper, manganese, nickel and optionally cobalt oxides, they produce carrier-supported catalysts which have an especially good thermal stability, as regards their activity.

The mechanical properties of the carrier should preferably be improved by means of addends, such as $SiO_2$ and/or $TiO_2$. These may be added in solid form, e.g. as Aerosil (this is a registered trademark) and/or in the form of titanium white, to the mixture of barium compound and aluminum oxide, or in the form of a brine, if the barium aluminate is prepared in aqueous phase.

It is also possible to further improve the mechanical properties of mixed calcium-barium aluminates or strontium-barium aluminates or calcium-strontium-barium aluminates by means of silicon-containing addends, such as silicon dioxide or silicic-acid containing minerals, e.g. talc, or by means of titanium dioxide.

The $SiO_2$ and/or $TiO_2$ addends improve the mechanical properties of the carrier and in addition to this avoid disintegration of the mixed oxide catalyst-particles by hydration, which occurs upon contact of the catalyst free from $SiO_2$ and/or $TiO_2$ with water.

In each of the following examples, a gas containing 3% by volume of $O_2$, 2% by volume of CO, 1000 p.p.m. (p.p.m. stands for parts per million) of n-hexane and 4.2% of water (this was gas corresponding to the exhaust gas of an internal combustion engine) was oxidized in admixture with air in contact with a carrier-supported catalyst, which contained as its active ingredients 5.3% of Cu, 3.06% of Mn and 1.63% of Ni (atomic ratio of Cu:Mn:Ni=1.5:1.0:0.5). The gas subjected to oxidation was preheated to the temperature necessary for testing. The oxidized gas was analyzed to determine the residual concentration of CO and n-hexane therein and the conversion rate of these two components, expressed in percent, was calculated therefrom.

EXAMPLE 1

(Prior art catalyst)

Aluminum oxide, which had a particle size of 3 mm. and a BET-surface area of 80 sq. m./g., was impregnated with an aqueous copper-manganese-nickel nitrate solution. Following decomposition of the nitrates at 400° C., the catalyst mass was subdivided into two 50% portions, of which one was annealed for 4 hours at 600° C. and the other was annealed for 18 hours at 1000° C.

The following conversion rates, which were a function of the reaction temperature, were produced:

| Catalyst mass | | | | | | | |
|---|---|---|---|---|---|---|---|
| Annealed for 4 hours at 600° C. | | | | Annealed for 18 hours at 1,000° C. | | | |
| CO | | n-Hexane | | CO | | n-Hexane | |
| ° C. | Conversion rate, percent | ° C. | Conversion rate, percent | ° C. | Conversion rate, percent | ° C. | Conversion rate, percent |
| 150 | 10 | 200 | 10 | 250 | 10 | 380 | 10 |
| 175 | 20 | 235 | 20 | 280 | 20 | 420 | 20 |
| 190 | 30 | 260 | 30 | 300 | 30 | 450 | 30 |
| 205 | 40 | 285 | 40 | 320 | 40 | 470 | 40 |
| 215 | 50 | 335 | 50 | 335 | 50 | 485 | 50 |
| 225 | 60 | 350 | 60 | 355 | 60 | 510 | 60 |
| 235 | 70 | 385 | 70 | 370 | 70 | 535 | 70 |
| 235 | 80 | 430 | 80 | 390 | 80 | 560 | 80 |
| 270 | 90 | 465 | 90 | 410 | 90 | 580 | 90 |
| 280 | 100 | 500 | 100 | 440 | 100 | 590 | 100 |

The activity of the catalyst mass annealed at 1000° C. was found to decrease considerably.

EXAMPLE 2

(Prior art catalyst)

Aluminum oxide, which had a particle size of 3 mm. and a BET-surface area of 0.25 sq. m./g., was impregnated with the metal nitrate solution of Example 1 and subjected to thermal treatment.

The following conversion rates, which were a function of the reaction temperature used, were produced.

| Catalyst mass ||||||||
| Annealed for 4 hours at 600° C. |||| Annealed for 18 hours at 1,000° C. ||||
| CO || n-Hexane || CO || n-Hexane ||
| ° C. | Conversion rate, percent | ° C. | Conversion rate, percent | ° C. | Conversion rate, percent | ° C. | Conversion rate, percent |
| --- | --- | --- | --- | --- | --- | --- | --- |
| 160 | 10 | 275 | 10 | 275 | 10 | 480 | 10 |
| 180 | 20 | 305 | 20 | 315 | 20 | 505 | 20 |
| 190 | 30 | 325 | 30 | 340 | 30 | 520 | 30 |
| 205 | 40 | 340 | 40 | 370 | 40 | 550 | 40 |
| 220 | 50 | 355 | 50 | 395 | 50 | 585 | 50 |
| 235 | 60 | 360 | 60 | 420 | 60 | 620 | 60 |
| 250 | 70 | 365 | 70 | 445 | 70 | | |
| 260 | 80 | 375 | 80 | 475 | 80 | | |
| 275 | 90 | 385 | 9) | 510 | 90 | | |
| 285 | 100 | 390 | 10) | 525 | 100 | | |

The activity of the catalyst mass annealed at 1000° C. was found to even more strongly decrease than in Example 1.

EXAMPLE 3

(Catalyst of invention)

102 grams of pulverulent aluminum oxide were intimately ground together with 153 grams of barium oxide in a vibratory disk mill. The resulting mixture was made into a paste with the use of an aqueous copper-manganese-nickel nitrate solution. Following a preliminary drying step, the mass was heated for 4 hours to 400° C. to effect decomposition of the nitrates. The resulting black powder was placed in a pelleting machine and pressed so as to obtain cylindrical shapes 3 mm. wide and 3–4 mm. long. A portion of the shapes so made was annealed for 4 hours at 600° C. and a second portion thereof was annealed for 18 hours at 1000° C.

The following conversion rates, which were a function of the reaction temperature, were produced.

| Catalyst mass ||||||||
| Annealed for 4 hours at 600° C. |||| Annealed for 18 hours at 1,000° C. ||||
| CO || n-Hexane || CO || n-Hexane ||
| ° C. | Conversion rate, percent | ° C. | Conversion rate, percent | ° C. | Conversion rate, percent | ° C. | Conversion rate, percent |
| --- | --- | --- | --- | --- | --- | --- | --- |
| 145 | 10 | 350 | 10 | 150 | 10 | 310 | 10 |
| 175 | 20 | 375 | 20 | 165 | 20 | 350 | 20 |
| 190 | 30 | 390 | 30 | 175 | 30 | 370 | 30 |
| 195 | 40 | 405 | 40 | 185 | 40 | 385 | 40 |
| 200 | 50 | 410 | 50 | 195 | 50 | 390 | 50 |
| 205 | 60 | 425 | 60 | 210 | 60 | 405 | 60 |
| 210 | 70 | 440 | 70 | 220 | 70 | 420 | 70 |
| 225 | 80 | 465 | 80 | 240 | 80 | 440 | 80 |
| 240 | 90 | 490 | 90 | 255 | 90 | 460 | 90 |
| 260 | 100 | 520 | 100 | 165 | 100 | 475 | 100 |

The catalyst mass annealed at the higher temperature was found to have an increased activity relative to the combustion of n-hexane.

EXAMPLE 4

(Catalyst of invention)

77 grams of aluminum oxide were ground together with 148 grams of barium carbonate, in a vibratory disk mill. The resulting mixture was further mixed with 5 weight percent of tylose, made into a paste with the use of water, and treated in an extruder so as to obtain strands with a diameter of 3 mm. Following drying at 105° C., the strands were cut into pieces substantially 3 mm. long, which were annealed for 10 hours at 1200° C. 200 grams of the carrier so made were impregnated with an aqueous solution of

|  | Grams |
| --- | --- |
| $Cu(NO_3)_2 \cdot 3H_2O$ | 46.2 |
| $Mn(NO_3)_2 \cdot 6H_2O$ | 36.6 |
| $Ni(NO_3)_2 \cdot 6H_2O$ | 18.55 | which was used in a quantity just to permit absorption thereof by the carrier. Following drying, the catalyst mass was heated to 400° C. to effect decomposition of the nitrates. A 50% portion of the catalyst mass was annealed for 4 hours at 600° C. and the other 50% portion was annealed for 18 hours at 1000° C.

The following conversion rates, which were a function of the reaction temperature, were produced:

| Catalyst mass ||||||||
| Annealed for 4 hours at 600° C. |||| Annealed for 18 hours at 1,000° C. ||||
| CO || n-Hexane || CO || n-Hexane ||
| ° C. | Conversion rate, percent | ° C. | Conversion rate, percent | ° C. | Conversion rate, percent | ° C. | Conversion rate, percent |
| --- | --- | --- | --- | --- | --- | --- | --- |
| 155 | 10 | 280 | 10 | 130 | 10 | 285 | 10 |
| 175 | 20 | 320 | 20 | 140 | 20 | 325 | 20 |
| 205 | 40 | 360 | 40 | 148 | 40 | 360 | 40 |
| 215 | 50 | 375 | 50 | 150 | 50 | 370 | 50 |
| 220 | 60 | 385 | 60 | 155 | 60 | 375 | 60 |
| 225 | 70 | 395 | 70 | 157 | 70 | 385 | 70 |
| 227 | 80 | 410 | 80 | 160 | 80 | 405 | 80 |
| 230 | 90 | 430 | 90 | 165 | 90 | 425 | 90 |
| 235 | 100 | 460 | 100 | 170 | 100 | 460 | 100 |

The two catalyst masses were found to have substantially the same activity, relative to the combustion of n-hexane. The catalyst annealed at 1000° C. was found to have an improved activity, relative to the combustion of CO, compared with that of the catalyst, which was annealed at 600° C.

EXAMPLE 5

(Catalyst of invention)

A mixture of                                     Grams
Al(NO₃)₃.9H₂O _____ 563
Ba(NO₃)₂ _____ 196
Cu(NO₃)₂.3H₂O _____ 43
Mn(NO₃)₂.6H₂O _____ 34
Ni(NO₃).6H₂O _____ 17 was melted and, following evaporation of the water of crystallization, the melt was heated for 2 hours at 400° C. to effect decomposition of the nitrates. The resulting black powder was placed in a pelleting machine and made into pellets substantially 3 mm. long and 3 mm. wide, of which a 50% portion was annealed for 4 hours at 600° C. and of which the other 50% portion was annealed for 18 hours at 1000° C.

The following conversion rates, which were a function of the reaction temperature, were produced:

| Catalyst mass | | | | | | | |
|---|---|---|---|---|---|---|---|
| Annealed for 4 hours at 600° C. | | | | Annealed for 18 hours at 1,000° C. | | | |
| CO | | n-Hexane | | CO | | n-Hexane | |
| ° C. | Conversion rate, percent | ° C. | Conversion rate, percent | ° C. | Conversion rate, percent | ° C. | Conversion rate, percent |
| 180 | 10 | 300 | 10 | 160 | 10 | 305 | 10 |
| 195 | 20 | 350 | 20 | 175 | 20 | 360 | 20 |
| 210 | 30 | 390 | 30 | 190 | 30 | 390 | 30 |
| 220 | 40 | 425 | 40 | 195 | 40 | 410 | 40 |
| 230 | 50 | 450 | 50 | 205 | 50 | 420 | 50 |
| 240 | 60 | 475 | 60 | 220 | 60 | 435 | 60 |
| 250 | 70 | 495 | 70 | 235 | 70 | 460 | 70 |
| 270 | 80 | 525 | 80 | 255 | 80 | 480 | 80 |
| 300 | 90 | 570 | 90 | 275 | 90 | 525 | 90 |
| 325 | 100 | 610 | 100 | 290 | 100 | 560 | 100 |

The catalyst annealed at 1000° C. was found to be more active than the catalyst annealed at lower temperature, relative to CO and n-hexane.

EXAMPLE 6

(Catalyst of invention)

200 grams of aluminum oxide, which had a particle size of 3 mm. and a BET-surface area of 80 sk. m./gram, were heated for 2 hours to 80° C. together with 108 grams of barium hydroxide and 200 milliliters of water, and the whole was reflux-boiled for 30 minutes. Supernatant solution was decanted and the carrier which remained behind was dried and annealed for 18 hours at 1000° C. The carrier, which contained 12.3% of barium, was impregnated with a copper-manganese-nickel nitrate solution and annealed once again for 18 hours at 1000° C., following the decomposition of the nitrates.

The carrier-supported catalyst so made was found to produce the following conversion rates, which were a function of the reaction temperature.

| CO | | n-Hexane | |
|---|---|---|---|
| ° C. | Conversion rate, percent | ° C. | Conversion rate, percent |
| 140 | 10 | 320 | 10 |
| 150 | 20 | 345 | 20 |
| 160 | 30 | 355 | 30 |
| 165 | 40 | 370 | 40 |
| 170 | 50 | 380 | 50 |
| 175 | 60 | 400 | 60 |
| 190 | 70 | 420 | 70 |
| 195 | 80 | 445 | 80 |
| 210 | 90 | 465 | 90 |
| 220 | 100 | 480 | 100 |

EXAMPLE 7

(Catalyst of invention)

76.5 grams of aluminum oxide, 148 grams of barium carbonate and 21.5 grams of silicon dioxide were jointly ground in a vibratory disk mill. Following the addition of 5 weight percent of tylose, the mixture was made into a paste using water, pressed into strands with a diameter of 3 mm., which were dried at 105° C., cut into pieces substantially 3 mm. long, and annealed for 10 hours at 1170° C.

Following impregnation of the carrier so made with the metal oxides (cf. Example 4), a 50% portion of the carrier-supported catalyst was annealed for 4 hours at 600° C. and the other 50% portion thereof was annealed for 18 hours at 1000° C.

The following conversion rates, which were a function of the reaction temperature, were produced:

| Catalyst mass | | | | | | | |
|---|---|---|---|---|---|---|---|
| Annealed for 4 hours at 600° C. | | | | Annealed for 18 hours at 1,000° C. | | | |
| CO | | n-Hexane | | CO | | n-Hexane | |
| ° C. | Conversion rate, percent | ° C. | Conversion rate, percent | ° C. | Conversion rate, percent | ° C. | Conversion rate, percent |
| 160 | 10 | 310 | 10 | 145 | 10 | 320 | 10 |
| 175 | 20 | 350 | 20 | 160 | 20 | 350 | 20 |
| 185 | 30 | 375 | 30 | 175 | 30 | 365 | 30 |
| 190 | 40 | 400 | 40 | 185 | 40 | 375 | 40 |
| 195 | 50 | 415 | 50 | 190 | 50 | 390 | 50 |
| 195 | 60 | 425 | 60 | 200 | 60 | 405 | 60 |
| 220 | 70 | 440 | 70 | 210 | 70 | 420 | 70 |
| 215 | 80 | 460 | 80 | 225 | 80 | 440 | 80 |
| 220 | 90 | 475 | 90 | 240 | 90 | 470 | 90 |
| 240 | 100 | 485 | 100 | 245 | 100 | 480 | 100 |

EXAMPLE 8

(Catalyst of invention)

The catalyst was prepared substantially in the manner described in Example 7, save that titanium dioxide was substituted for silicon dioxide.

The following conversion rates, which were a function of the reaction temperature, were produced:

| Catalyst mass | | | | | | | |
|---|---|---|---|---|---|---|---|
| Annealed for 4 hours at 600° C. | | | | Annealed for 18 hours at 1,000° C. | | | |
| CO | | n-Hexane | | CO | | n-Hexane | |
| ° C. | Conversion rate, percent | ° C. | Conversion rate, percent | ° C. | Conversion rate, percent | ° C. | Conversion rate, percent |
| 145 | 10 | 330 | 10 | 150 | 10 | 320 | 10 |
| 165 | 20 | 355 | 20 | 160 | 20 | 345 | 20 |
| 180 | 30 | 380 | 30 | 165 | 30 | 360 | 30 |
| 190 | 40 | 405 | 40 | 180 | 40 | 375 | 40 |
| 200 | 50 | 430 | 50 | 190 | 50 | 395 | 50 |
| 205 | 60 | 440 | 60 | 200 | 60 | 410 | 60 |
| 215 | 70 | 455 | 70 | 205 | 70 | 425 | 70 |
| 230 | 80 | 470 | 80 | 220 | 80 | 440 | 80 |
| 250 | 90 | 480 | 90 | 240 | 90 | 460 | 90 |
| 275 | 100 | 490 | 100 | 250 | 100 | 475 | 100 |

The catalyst mass annealed at the higher temperature indicated above was found to be more active than the catalyst annealed at the lower temperature, relatives to the combustion of CO and n-hexane.

EXAMPLE 9

(Catalyst of invention)

156 grams of aluminum hydroxide and 255 grams of barium oxide were reflux-boiled for 2 hours together with 750 milliliters of water. 130 grams of a 30% silicic acid sol were added thereto and heating was continued for a further 2 hours. Following evaporation of the water, the solid mass was crushed and pressed into articles with a length between 3 and 4 mm. and a diameter of 3 mm., and the articles so made were annealed for 10 hours at 1200° C. They contained 10% of $SiO_2$. Following impregnation with the metal oxides (cf. Example 4), they were annealed for 18 hours at 1000° C.

The catalyst was found to produce the following conversion rates, relative to the combustion of CO and n-hexane.

| CO | | n-Hexane | |
|---|---|---|---|
| ° C. | Conversion rate, percent | ° C. | Conversion rate, percent |
| 150 | 10 | 325 | 10 |
| 165 | 20 | 350 | 20 |
| 175 | 30 | 363 | 30 |
| 180 | 40 | 380 | 40 |
| 195 | 50 | 395 | 50 |
| 210 | 60 | 415 | 60 |
| 225 | 70 | 445 | 70 |
| 243 | 80 | 460 | 80 |
| 260 | 90 | 490 | 90 |
| 280 | 100 | 525 | 100 |

EXAMPLE 10

(Catalyst of invention)

50.5 grams of aluminum hydroxide, 193 grams of barium oxide, 500 milliliters of water and 187 grams of a 30% silicic acid sol were treated in the manner described in Example 3 and made into a carrier, which contained 20% of $SiO_2$. Following impregnation with the metal oxide (cf. Example 4), the catalyst was annealed for 18 hours at 1000° C.

The resulting catalyst was found to produce the following conversion rates, relative to the combustion of CO and n-hexane:

| CO | | n-Hexane | |
|---|---|---|---|
| ° C. | Conversion rate, percent | ° C. | Conversion rate, percent |
| 165 | 10 | 340 | 10 |
| 170 | 20 | 390 | 20 |
| 190 | 30 | 430 | 30 |
| 205 | 40 | 460 | 40 |
| 220 | 50 | 485 | 50 |
| 235 | 60 | 510 | 60 |
| 250 | 70 | 530 | 70 |
| 270 | 80 | 550 | 80 |
| 290 | 90 | 570 | 90 |
| 305 | 100 | 585 | 100 |

EXAMPLE 11

(Catalyst of invention)

| A mixture of | Grams |
|---|---|
| $Al(NO_3)_3 \cdot 9H_2O$ | 750 |
| $Ba(NO_3)_2$ | 261 |
| $Mn(NO_3)_2 \cdot 2H_2O$ | 53 |
| $Ni(NO_3)_2 \cdot 6H_2O$ | 27 |
| 30% silicic acid sol | 106 |
| $Cu(NO_3)_2 \cdot 2H_2O$ | 66 | was evaporated to dryness, with agitation, and heated until the nitrates commenced decomposition. To effect complete decomposition of the nitrates, the dark-colored, partially powdery product was heated for 4 hours at 400° C.

The resulting catalyst powder was pressed into cylindrical shapes with a diameter of 3 mm. and a length between 3 and 4 mm. A 50% portion thereof was annealed for 4 hours at 600° C. and the other 50% portion was annealed for 18 hours at 1000° C.

The following conversion rates, which were a function of the reaction temperature, were produced:

| Catalyst mass | | | | | | | |
|---|---|---|---|---|---|---|---|
| Annealed for 4 hours at 600° C. | | | | Annealed for 18 hours at 1,000° C. | | | |
| CO | | n-Hexane | | CO | | n-Hexane | |
| ° C. | Conversion rate, percent | ° C. | Conversion rate, percent | ° C. | Conversion rate, percent | ° C. | Conversion rate, percent |
| 215 | 10 | 400 | 10 | 150 | 10 | 325 | 10 |
| 245 | 20 | 440 | 20 | 175 | 20 | 380 | 20 |
| 265 | 30 | 470 | 30 | 193 | 30 | 415 | 30 |
| 280 | 40 | 495 | 40 | 205 | 40 | 435 | 40 |
| 300 | 50 | 500 | 50 | 215 | 50 | 455 | 50 |
| 315 | 60 | 515 | 60 | 223 | 60 | 463 | 60 |
| 343 | 7 | 525 | 70 | 250 | 70 | 468 | 70 |
| 360 | 80 | 540 | 80 | 258 | 80 | 475 | 80 |
| 370 | 90 | 555 | 90 | 275 | 90 | 490 | 90 |
| 400 | 100 | 575 | 100 | 300 | 100 | 515 | 100 |

The catalyst annealed at 1000° C. was found to be substantially more active than the catalyst annealed at 600° C., relative to the combustion of the above two components.

EXAMPLE 12

(Catalyst of invention)

The catalyst of Example 1, which was annealed for 18 hours at 1000° C., was digested for 2 hours at temperatures between 70 and 80° C. in a barium hydroxide solution saturated at 70° C. Following decantation of the supernatant barium hydroxide solution, the catalyst mass was dried and annealed for 18 hours at 1000° C. The catalyst contained 12% of barium.

Its activity was determined and the following results were obtained:

| CO | | n-Hexane | |
|---|---|---|---|
| ° C. | Conversion rate, percent | ° C. | Conversion rate, percent |
| 145 | 10 | 315 | 10 |
| 160 | 20 | 345 | 20 |
| 175 | 30 | 375 | 30 |
| 180 | 40 | 390 | 40 |
| 190 | 50 | 400 | 50 |
| 200 | 60 | 410 | 60 |
| 210 | 70 | 415 | 70 |
| 230 | 80 | 420 | 80 |
| 255 | 90 | 435 | 90 |
| 275 | 100 | 450 | 100 |

By the incorporation of barium it was possible to reactivate the thermally inactivated catalyst on the aluminum oxide carrier.

In the following examples, reference is made to the temperature at which 50% of the CO or n-hexane were found to have underwent combustion ($U_{50\ CO}$ and $U_{50\ hex}$, respectively), as an index of the catalyst's activity.

EXAMPLE 13

(Prior art catalyst)

Aluminum oxide, which had a particle size of 3 mm. and a BET-surface area of 80 sq. m./gram, was impregnated with an aqueous copper-manganese-nickel nitrate solution. Following this, the whole was heated to 400° C. to effect decomposition of the nitrates. The resulting catalyst mass was annealed for 18 hours at 1000° C.

Its activity was determined and found to be:

$U_{50\ CO}$: 335° C.    $U_{50\ hex}$: 485° C.

EXAMPLE 14

(Catalyst of invention)

102 grams of powdery aluminum oxide were intimately ground together with 56 grams of calcium oxide, in a vibratory disk mill and 8 grams of graphite were added to the resulting mixture. In a pelleting machine, the mass so made was pressed into cylindrical shapes with a diameter of 3 mm. and a length between 3 and 4 mm. The shapes were annealed for 18 hours at 1200° C. The resulting carrier was impregnated with an aqueous solution of

| | Grams |
|---|---|
| $Cu(NO_3)_2 \cdot 3H_2O$ | 44.5 |
| $Mn(NO_3)_2 \cdot 6H_2O$ | 35.2 |
| $Ni(NO_3)_2 \cdot 6H_2O$ | 17.9 | which was used in the quantity necessary just to permit absorption thereof by the carrier. Following this, the carrier was heated to 400° C. to effect decomposition of the nitrates and the resulting catalyst mass was annealed for 18 hours at 1000° C.

The catalyst's activity was determined and found to be:

$U_{50\ CO}$: 210° C.    $U_{50\ hex}$: 415° C.

EXAMPLE 15

(Catalyst of invention)

187 grams of $Al(OH)_3$, 34.2 grams of $Ba(OH)_2$ and 74.1 grams of $Ca(OH)_2$ were intimately mixed together and, following the addition of 12 grams of graphite, the mixture was made in a pelleting machine into shapes with a diameter substantially of 3 mm. and a length of 3 mm. The shapes were annealed for 10 hours at 1340° C. and impregnated with an aqueous metal nitrate solution (cf. Example 14). Following decomposition of the nitrates at 400°, the catalyst mass was annealed for 18 hours at 1000° C.

The catalyst's activity was determined and found to be:

$U_{50\ CO}$: 175° C.    $U_{50\ hex}$: 375° C.

EXAMPLE 16

(Catalyst of invention)

204 grams of $Al_2O_3$, 51.1 grams of BaO, 93.6 grams of CaO and 16.4 grams of talc ($Mg_3Si_4O_{10}(OH)_2$) were intimately mixed together and, following the addition of 18 grams of graphite, the whole was made in a pelleting machine into cylindrical shapes with a diameter substantially of 3 mm. and a length of 3 mm. To further improve the strength of the shapes, they were annealed for 10 hours at 1300° C. Following this, they were impregnated with an aqueous metal nitrate solution (cf. Example 14), and the resulting catalyst mass was annealed for 18 hours at 1000° C., after decomposition of the nitrates at 400° C.

The catalyst's activity was determined and found to be:

$U_{50\ CO}$: 182° C.    $U_{50\ hex}$: 380° C.

EXAMPLE 17

(Catalyst of invention)

61.2 grams of $Al_2O_3$, 15.3 grams of BaO, 40.4 grams of CaO and 13.2 grams of $SiO_2$ were intimately ground together in a vibratory disk mill. Following the addition of 8 grams of graphite lubricant, the whole was made in a pelleting machine into cylindrical shapes with a diameter substantially of 3 mm. and a length of 3 mm. The shapes which contained substantially 10% of $SiO_2$ were annealed for 10 hours at 1300° C. and impregnated later with an aqueous metal nitrate solution (cf. Example 14). Following decomposition of the nitrates at 400° C., the catalyst mass was annealed for 18 hours at 1000° C.

The catalyst's activity was determined and found to be:

$U_{50\ CO}$: 190° C.   $U_{50\ hex}$: 390° C.

EXAMPLE 18

(Catalyst of invention)

102 grams of $Al_2O_3$, 25.6 grams of BaO, 91.4 grams of CaO and 53.2 grams of Aerosil (registered trademark) were ground together in a vibratory disk mill. Following the addition of 14 grams of graphite, the mixture was pressed into shapes with a diameter of 3 mm. and a length of 3 mm. The shapes, which contained substantially 20% of $SiO_2$, were annealed for 10 hours at 1100° C. and impregnated later with an aqueous metal nitrate solution (cf. Example 14). Following decomposition of the nitrates at 400° C., the catalyst mass was annealed for 18 hours at 1000° C.

The catalyst's activity was determined and found to be:

$U_{50\ CO}$: 205° C.   $U_{50\ hex}$: 410° C.

EXAMPLE 19

(Catalyst of invention)

61.2 grams of $Al_2O_3$, 15.3 grams of BaO, 40.4 grams of CaO and 17.6 grams of $TiO_2$ were made into cylindrical shapes in the manner described in Example 17. The shapes, which contained substantially 13% of $TiO_2$ were annealed for 10 hours at 1300° C., impregnated later with an aqueous metal nitrate solution (cf. Example 14), annealed at 400° C. to effect decomposition of the nitrates and further annealed for 18 hours at 1000° C.

The catalyst's activity was determined and found to be:

$U_{50\ CO}$: 195° C.   $U_{50\ hex}$: 390° C.

EXAMPLE 20

(Catalyst of invention)

102 grams of $Al_2O_3$, 17.3 grams of SrO and 41.7 grams of CaO were made into cylindrical shapes in the manner described in Example 17. The shapes were annealed for 10 hours at 1250° C., impregnated later with an aqueous metal nitrate solution (cf. Example 14), annealed at 400° C. to effect decomposition of the nitrates and further annealed for 18 hours at 1000° C.

The catalyst's activity was determined and found to be:

$U_{50\ CO}$: 185° C.   $U_{50\ hex}$: 380° C.

EXAMPLE 21

(Catalyst of invention)

102 grams of $Al_2O_3$, 25.6 grams of BaO and 86.3 grams of SrO were made into a catalyst mass in the manner described in Example 20.

The catalyst's activity was determined and found to be:

$U_{50\ CO}$: 170° C.   $U_{50\ hex}$: 375° C.

EXAMPLE 22

(Catalyst of invention)

102 grams of $Al_2O_3$ and 103.6 grams of SrO were made into a carrier-supported catalyst in the manner described in Example 20.

The catalyst's activity was determined and found to be:

$U_{50\ CO}$: 190° C.   $U_{50\ hex}$: 385° C.

EXAMPLE 23

(Catalyst of invention)

102 grams of $Al_2O_3$, 25.6 grams of BaO, 23.3 grams of CaO and 43.3 grams of SrO were intimately mixed together in a vibratory disk mill. Following the addition of 10 grams of graphite, the mixture was pressed into shapes with a diameter of 3 mm. and a length of 3 mm., which were annealed for 10 hours at 1200° C. and impregnated later with a metal nitrate solution (cf. Example 14). Following decomposition of the nitrates at 400° C., the catalyst mass was annealed for 18 hours at 1000° C.

The catalyst's activity was determined and found to be:

$U_{50\ CO}$: 185° C.   $U_{50\ hex}$: 400° C.

What is claimed is:

1. A carrier-supported catalyst, wherein the active ingredients consist essentially of oxides of copper, manganese, nickel and optionally cobalt and wherein the atomic proportions of copper to manganese to the sum of nickel and cobalt are between 0.2–5, 0.2–5 and 0.1–2, the catalyst containing as the carrier an aluminate of at least one alkaline earth metal selected from the group consisting of barium, strontium, calcium and mixtures thereof.

2. The carrier-supported catalyst as claimed in claim 1, wherein the alkaline earth metal aluminates are used in admixture with between 2 and 30 weight percent of silicon dioxide.

3. The carrier-supported catalyst as claimed in claim 1, wherein the alkaline earth metal aluminates are used in admixture with between 2 and 30 weight percent of magnesium silicate.

4. The carrier-supported catalyst as claimed in claim 1, wherein the alkaline earth metal aluminates are used in admixture with between 2 and 30 weight percent of titanium dioxide.

5. The carrier-suported catalyst as claimed in claim 1, wherein the alkaline earth metal aluminates are used in admixture with a total proportion between 2 and 30 weight percent of silicon dioxide and titanium dioxide.

6. A process for making a carrier-supported catalyst as claimed in claim 1, which comprises impregnating the alkaline earth metal aluminates with an aqueous solution of copper, manganese, nickel and optionally cobalt salts of volatile acids, the solution being used in the quantity necessary just to permit complete absorption thereof by the said aluminates; decomposing the metal salts applied to the alkaline earth metal aluminates, at temperatures between 300 and 600° C.; and annealing the resulting catalyst at temperatures between 600 and 1200° C.

7. The process as claimed in claim 6, wherein the salts of volatile acids are nitrates.

8. The process as claimed in claim 7, wherein the metal nitrates are decomposed at temperatures between 350 and 450° C.

9. The process as claimed in claim 6, wherein the annealing step is effected at temperatures between 600 and 1000° C.

References Cited

UNITED STATES PATENTS

| | | | |
|---|---|---|---|
| 3,179,488 | 4/1965 | Appell | 252—466 J X |
| 3,207,704 | 9/1965 | Stephens et al. | 252—455 R X |
| 3,340,011 | 9/1967 | Hoekstra et al. | 252—455 R X |
| 3,737,396 | 6/1973 | Negra et al. | 252—466 J |
| 3,740,349 | 6/1973 | Negra et al. | 252—466 J |

PATRICK P. GARVIN, Primary Examiner

A. H. METZ, Assistant Examiner

U.S. Cl. X.R.

252—466 J; 423—213.2